(12) United States Patent
Hill et al.

(10) Patent No.: US 10,422,508 B2
(45) Date of Patent: Sep. 24, 2019

(54) SYSTEM AND METHOD FOR SPECTRAL TUNING OF BROADBAND LIGHT SOURCES

(71) Applicant: KLA-Tencor Corporation, Milpitas, CA (US)

(72) Inventors: Andrew V. Hill, Berkley, CA (US); Amnon Manassen, Haifa (IL); Ohad Bachar, Timrat (IL)

(73) Assignee: KLA-Tencor Corporation, Milpitas, CA (US)

( * ) Notice: Subject to any disclaimer, the term of this patent is extended or adjusted under 35 U.S.C. 154(b) by 108 days.

(21) Appl. No.: 15/339,312

(22) Filed: Oct. 31, 2016

(65) Prior Publication Data

US 2017/0350575 A1 Dec. 7, 2017

Related U.S. Application Data

(60) Provisional application No. 62/314,364, filed on Mar. 28, 2016, provisional application No. 62/365,129, filed on Jul. 21, 2016.

(51) Int. Cl.
*G02B 5/22* (2006.01)
*F21V 9/40* (2018.01)
(Continued)

(52) U.S. Cl.
CPC .................. *F21V 9/40* (2018.02); *G01J 3/00* (2013.01); *G02B 5/1828* (2013.01); *G02B 5/22* (2013.01);
(Continued)

(58) Field of Classification Search
CPC ....... G02B 5/20–5/3091; G02B 26/007; G02B 26/02–26/026
See application file for complete search history.

(56) References Cited

U.S. PATENT DOCUMENTS 4,991,934 A * 2/1991 Hettrick .................... G01J 3/06
356/328
6,067,106 A * 5/2000 Ishibe .................. G02B 5/1895
347/241

(Continued)

FOREIGN PATENT DOCUMENTS

WO 9728428 A1 8/1997
WO 2015137880 A1 9/2015

OTHER PUBLICATIONS

International Search Report dated Jun. 26, 2017 for PCT/US2017/024157.

*Primary Examiner* — William R Alexander
*Assistant Examiner* — Jeffrey E Madonna
(74) *Attorney, Agent, or Firm* — Suiter Swantz pc llo

(57) ABSTRACT

A tunable spectral filter includes a first tunable dispersive element, a first optical element, a spatial filtering element located at the focal plane, a second optical element, and a second dispersive element. The first tunable dispersive element introduces spectral dispersion to an illumination beam with an adjustable dispersion. The first optical element focuses the illumination beam at a focal plane in which a distribution of a spectrum of the spectrally-dispersed illumination beam at the focal plane is controllable by adjusting the dispersion of the first tunable dispersive element. The spatial filtering element filters the spectrum of the illumination beam based on the distribution of the spectrum of the illumination beam at the focal plane. The second optical element collects the spectrally-dispersed illumination beam transmitted from the spatial filtering element. The second tunable dispersive element removes the dispersion introduced by the first tunable dispersive element from the illumination beam.

56 Claims, 9 Drawing Sheets

(51) Int. Cl.
*G01J 3/00* (2006.01)
*G02B 5/18* (2006.01)
*G02B 5/26* (2006.01)
*G02B 26/08* (2006.01)
*G02F 1/33* (2006.01)

(52) U.S. Cl.
CPC .......... *G02B 5/26* (2013.01); *G02B 26/0825* (2013.01); *G02F 1/33* (2013.01); *G02F 2201/305* (2013.01); *G02F 2203/055* (2013.01)

(56) References Cited

U.S. PATENT DOCUMENTS

| | | | |
|---|---|---|---|
| 2002/0114076 A1* | 8/2002 | Dickson | G02B 5/1842 359/566 |
| 2003/0030915 A1* | 2/2003 | Amin | G02B 5/1814 359/663 |
| 2006/0051024 A1* | 3/2006 | Levola | G02B 5/1842 385/37 |
| 2008/0055692 A1* | 3/2008 | Saisho | G02B 26/124 359/196.1 |
| 2009/0026236 A1 | 1/2009 | Krause | |
| 2009/0262366 A1 | 10/2009 | Den Boef | |
| 2009/0303562 A1 | 12/2009 | Koeppen et al. | |
| 2010/0314554 A1 | 12/2010 | Galimberti et al. | |
| 2014/0036245 A1 | 2/2014 | Sogard | |
| 2015/0104180 A1* | 4/2015 | Zimer | H04B 10/572 398/95 |
| 2018/0143426 A1* | 5/2018 | Ayres | G02B 27/0025 |

* cited by examiner

SYSTEM AND METHOD FOR SPECTRAL TUNING OF BROADBAND LIGHT SOURCES

CROSS-REFERENCE TO RELATED APPLICATION

The present application claims the benefit under 35 U.S.C. § 119(e) of U.S. Provisional Application Ser. No. 62/314,364, filed Mar. 28, 2016, entitled SPECTRAL TUNING OF BROADBAND COHERENT LIGHT SOURCES, naming Andrew V. Hill, Amnon Manassen, and Ohad Bachar as inventors, which is incorporated herein by reference in the entirety.

The present application claims the benefit under 35 U.S.C. § 119(e) of U.S. Provisional Application Ser. No. 62/365,129, filed Jul. 21, 2016, entitled SYSTEM AND METHOD FOR SPECTRAL TUNING OF BROADBAND LIGHT SOURCES, naming Andrew V. Hill, Amnon Manassen, and Ohad Bachar as inventors, which is incorporated herein by reference in the entirety.

TECHNICAL FIELD

The present disclosure relates generally to broadband light sources, and more particularly, to spectral control of broadband light sources.

BACKGROUND

Illumination sources used for optical metrology systems typically have demanding operational requirements and tight tolerances to provide accurate metrology data. In some applications, it may be desirable to provide illumination with continuous tenability of the center wavelength and bandwidth. For example, in a scatterometry overlay metrology system, the sensitivity of an overlay measurement may vary significantly for different wavelengths of illumination based on small variations in the overlay targets. Accordingly, precise control of the center wavelength of the illumination beam over a continuous range of wavelengths may provide accurate measurements for a wide range of conditions. Further, it may be desirable to provide illumination at a high brightness to facilitate tight focusing and high focused intensities. Accordingly, independent control of the bandwidth of the illumination beam may provide control over the brightness of an illumination beam.

However, typical tunable light sources may suffer from low brightness for one or more illumination wavelengths, a low steepness between transmitted and filtered illumination wavelengths, an inability to independently modify a central wavelength and a bandwidth of illumination, intensity noise, spectral instabilities, or the like. Therefore, it would be desirable to provide a system and method for curing defects such as those of the identified above.

BRIEF DESCRIPTION OF DRAWINGS

The numerous advantages of the disclosure may be better understood by those skilled in the art by reference to the accompanying figures in which.

SUMMARY

Figure 1:
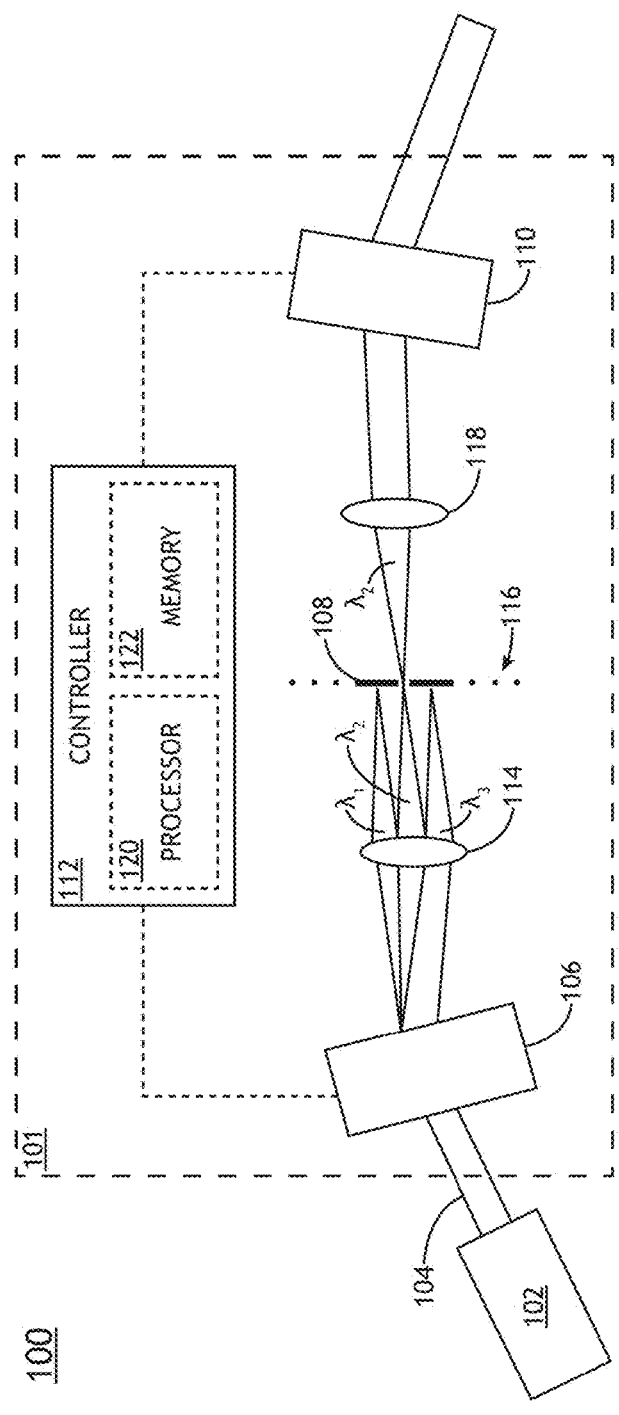
FIG. 1 is a conceptual view illustrating a tunable spectral filter, in accordance with one or more embodiments of the present disclosure.

A tunable spectral filter is disclosed, in accordance with one or more embodiments of the present disclosure. In one illustrative embodiment, the filter includes a first tunable dispersive element. In another illustrative embodiment, a dispersion of the first tunable dispersive element is adjustable. In another illustrative embodiment, the first tunable dispersive element introduces spectral dispersion to an illumination beam. In another illustrative embodiment, the filter includes a first optical element to receive the illumination beam from the first tunable dispersive element and focus the illumination beam at a focal plane. In another illustrative embodiment, a spatial distribution of a spectrum of the illumination beam at the focal plane is controllable by adjusting the dispersion of the first tunable dispersive element. In another illustrative embodiment, the system includes a spatial filtering element located at the focal plane. In another illustrative embodiment, the spatial filtering element filters a spectrum of the illumination beam based on the spatial distribution of the spectrum of the illumination beam at the focal plane. In another illustrative embodiment, the filter includes a second optical element to collect the illumination beam having a filtered spectrum from the spatial filtering element. In another illustrative embodiment, the filter includes a second tunable dispersive element to receive the illumination beam from the second optical element. In another illustrative embodiment, a dispersion of the second tunable dispersive element may correspond to the dispersion of the first tunable dispersive element. In another illustrative embodiment, the second tunable dispersive element removes the spectral dispersion introduced by the first tunable dispersive element from the illumination beam.

A tunable spectral filter is disclosed, in accordance with one or more illustrative embodiments of the present disclosure. In one illustrative embodiment, the filter includes a first tunable dispersive element. In another illustrative embodiment, a dispersion of the first tunable dispersive element is adjustable. In another illustrative embodiment, the first tunable dispersive element introduces spectral dispersion to an illumination beam. In another illustrative embodiment, the filter includes a first optical element to receive the illumination beam from the first tunable dispersive element and focus the illumination beam at a first focal plane. In another illustrative embodiment, a spatial distribution of a spectrum of the illumination beam at the first focal plane is controllable by adjusting the dispersion of the first tunable dispersive element. In another illustrative embodiment, the filter includes a first filtering segment located at the first focal plane. In another illustrative embodiment, the first filtering segment filters a spectrum of the illumination beam based on the spatial distribution of the spectrum of the illumination beam at the first focal plane. In another illustrative embodiment, the filter includes a second optical element to collect the illumination beam from the first filtering segment. In another illustrative embodiment, the filter includes a beam steering element configured to receive the illumination beam from the second optical element and adjustably modify the trajectory of the illumination beam. In another illustrative embodiment, the filter includes a third optical element to receive the illumination beam from the beam steering element and focus the illumination beam at a second focal plane. In another illustrative embodiment, a spatial distribution of a spectrum of the illumination beam at the second focal plane is controllable by adjusting the beam steering element. In another illustrative embodiment, the filter includes a second filtering segment located at the first focal plane. In another illustrative embodiment, the second filtering segment filters a spectrum of the illumination beam based on the spatial distribution of the spectrum of the illumination beam at the second focal plane. In another illustrative embodiment, the filter includes a fourth optical element configured to collect the illumination beam from the second filtering segment. In another illustrative embodiment, the filter includes a second tunable dispersive element to receive the illumination beam from the fourth optical element. In another illustrative embodiment, a dispersion of the second tunable dispersive element may correspond to the dispersion of the first tunable dispersive element. In another illustrative embodiment, the second tunable dispersive element removes the spectral dispersion introduced by the first tunable dispersive element from the illumination beam.

A tunable broadband illumination source is disclosed, in accordance with one or more illustrative embodiments of the present disclosure. In one illustrative embodiment, the source includes an illumination source configured to generate an illumination beam. In another illustrative embodiment, the source includes a tunable spectral filter to receive the illumination beam. In another illustrative embodiment, the source includes a first tunable dispersive element. In another illustrative embodiment, a dispersion of the first tunable dispersive element is adjustable. In another illustrative embodiment, the first tunable dispersive element introduces spectral dispersion to the illumination beam. In another illustrative embodiment, the source includes a first optical to receive the illumination beam from the first tunable dispersive element and focus the illumination beam at a focal plane. In another illustrative embodiment, a spatial distribution of a spectrum of the illumination beam at the focal plane is controllable by adjusting the dispersion of the first tunable dispersive element. In another illustrative embodiment, the source includes a spatial filtering element located at the focal plane. In another illustrative embodiment, the spatial filtering element filters a spectrum of the illumination beam based on the spatial distribution of the spectrum of the illumination beam at the focal plane. In another illustrative embodiment, the source includes a second optical element to collect the illumination beam having a filtered spectrum from the spatial filtering element. In another illustrative embodiment, the source includes a second tunable dispersive element to receive the illumination beam from the second optical element. In another illustrative embodiment, a dispersion of the second tunable dispersive element may correspond to the dispersion of the first tunable dispersive element. In another illustrative embodiment, the second tunable dispersive element removes the spectral dispersion introduced by the first tunable dispersive element from the illumination beam.

A method for tuning a broadband illumination source is disclosed, in accordance with one or more illustrative embodiments of the present disclosure. In one illustrative embodiment, the method includes introducing spectral dispersion to an illumination beam with a first tunable dispersive element. In another illustrative embodiment, a dispersion of the first tunable dispersive element is adjustable. In another illustrative embodiment, the method includes focusing the illumination beam at a focal plane. In another illustrative embodiment, a distribution of a spectrum of the illumination beam at the focal plane is controllable by adjusting the dispersion of the first tunable dispersive element. In another illustrative embodiment, the method includes spatially filtering the spectrum of the illumination beam at the focal plane. In another illustrative embodiment, the method includes removing the spectral dispersion of the illumination beam with a second tunable dispersive element, wherein a dispersion of the second tunable dispersive element is configured to correspond to the dispersion of the first tunable dispersive element.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1 through 6, systems and methods for tuning the spectral content of broadband illumination sources are disclosed, in accordance with one or more embodiments of the present disclosure. For example, a broadband illumination source may include a spatially coherent illumination source such as, but not limited to, a supercontinuum laser. Embodiments of the present disclosure are directed to a tunable spectral filter such that the distribution of passed wavelengths of a spectrum of an illumination beam may be rapidly adjusted. In some embodiments, a tunable spectral filter includes a tunable dispersive element to introduce spectral dispersion into an illumination beam. For example, the tunable dispersive element may include an acousto-optic deflector in which a diffraction grating generated by acoustic waves propagating in a crystal may have a rapidly tunable pitch and modulation depth. Additional embodiments are directed to a tunable filter having an optical element to focus the spectrally dispersed illumination beam to a spatial filter such that the spatial filter filters the spectrum of the illumination beam based on a spatial distribution of the spectrum of the illumination beam on the spatial filter. Additional embodiments are directed to a tunable spectral filter including an additional optical element to direct the filtered illumination beam to an additional tunable dispersive element to remove the spectral dispersion introduced by the first tunable dispersive element. For example, a dispersion of the second tunable dispersive element may dynamically adjust to correspond to the dispersion of the first tunable dispersive element. In this regard, the spectral components of the illumination beam may be recombined to a single beam with high brightness. Further embodiments of the present disclosure are directed to a tunable broadband illumination source including a tunable spectral filter.

It is recognized herein that intensity of a focused beam of illumination depends at least in part on the brightness of the illumination source (e.g. a ratio of the power of an illumination beam to the square of the product of the beam diameter and the beam divergence). Further, the degree of spatial coherence of the illumination beam affects the degree to which an illumination beam may be tightly focused. Accordingly, a spatially coherent illumination beam with a broad spectrum and a low divergence may be particularly suitable for a tunable illumination source. For example, a supercontinuum laser may provide a broad, continuous spectrum of illumination with a high brightness suitable for tight focusing. In this regard, tunable illumination source may include a spatially coherent source (e.g. a supercontinuum laser source, or the like) and a tunable spectral filter to select a desired portion of the spectrum of the source.

It is further recognized that acousto-optic deflectors may be particularly well suited for dispersing (e.g. diffracting) broadband light, including spatially coherent light. An acousto-optic deflector may include a diffraction grating induced in a crystal by a transducer driven at an RF frequency. In this regard, broadband illumination incident on the acousto-optic deflector may be diffracted into one or more diffracted orders. For example, an acousto-optic tunable filter (AOTF) may utilize this principle to select a portion of light from an incident beam that is diffracted at a particular angle. In this regard, the wavelength of light exiting an AOTF may be selected by adjusting the driving frequency, and thus the pitch of the generated diffraction grating, of the acousto-optic deflector.

However, AOTFs may have several disadvantages that make them unsuitable for certain applications. For example, AOTFs may provide limited control of the bandwidth of the selected beam and attempts to modify the bandwidth (e.g., adjusting the modulation depth of the grating based on the intensity of the driving signal, or the like) may introduce intensity noise to the output beam, which may degrade performance in certain applications. Additionally, the output beam may be spectrally dispersed. For instance, each wavelength of an input beam may be diffracted at a different angle. Accordingly, the output beam may include a larger divergence angle than the input beam, which may reduce the brightness. Further, the output beam may include spatial chirp such that the spectrum of the output beam is spatially dispersed across the beam profile.

Embodiments of the present disclosure are directed to a tunable filter including a first tunable dispersive element (e.g. an acousto-optic deflector, or the like) to introduce spectral dispersion into an illumination beam, a spatial filter to modify the spectrum of the illumination beam, and a second tunable dispersive element to remove the dispersion introduced by the first tunable dispersive element. For example, the spatial filter may include an aperture to select a portion of the spectrum of the illumination beam. In this regard, a center wavelength of an output beam may be selected based on a dispersion of the first tunable dispersive element (e.g. a driving frequency of an acousto-optic deflector, or the like) and a bandwidth of the output beam may be independently selected based on a width of the aperture. Additionally, the second tunable dispersive element may remove the dispersion associated with the filtered illumination beam such that the output beam may have the same divergence as the input beam and may be free of spatial chirp.

In a general sense, a spectral filter may selectively pass (e.g. transmit or reflect) select wavelengths of illumination (e.g. electromagnetic radiation, or the like). For example, a spectral filter may selectively modify the spectral power (e.g. the power per unit wavelength) of illumination. Further, a spectral filter may typically only reduce the spectral power of illumination. Accordingly, a spectral transmittance of a spectral filter may describe the transmittance (e.g. from 0% to 100%, 0 to 1, or the like) of illumination as a function of wavelength. It is noted that transmittance may refer to illumination passed by the filter through transmission and/or reflection.

Further, the spectral transmittance of a tunable spectral filter may be adjustable. In this regard, a tunable spectral filter may dynamically modify the spectral content of an illumination source. For example, a tunable spectral filter operating as a tunable band-pass filter may, but is not required to, dynamically modify: the central wavelength of passed illumination, a low-pass cutoff wavelength, a high-pass cutoff wavelength, a sharpness of a transition between passed wavelengths and filtered wavelengths, or the like. By way of another example, a tunable spectral filter may dynamically modify the spectral power of one or more selected wavelengths of illumination (e.g., modify the spectral transmittance of the filter for the one or more selected wavelengths, or the like) to provide a tailored spectral profile of an illumination source.

In the context of illumination sources for metrology systems, a tunable spectral filter may control the spectral content of filtered illumination (e.g., the bandwidth of illumination, the central wavelength of the pass-band, or the like) to be directed to a sample (e.g., a semiconductor wafer, or the like). In this regard, a metrology system may include a broadband illumination source and a tunable spectral filter to selectively filter the spectrum of the illumination source to provide illumination with desired spectral properties to the sample. Further, a tunable spectral filter may provide, but is not required to provide, rapid modification of the spectral content of filtered illumination, a stable spectrum of filtered illumination, minimal loss of spectral power within a desired spectral range for passed illumination, maximal attenuation of spectral power within an undesired spectral range for rejected illumination, a sharp transition between passed wavelengths and rejected wavelengths of illumination, a high tunable spectral resolution (e.g., an ability to selectively modify the spectral power of a narrow wavelength range, or the like), and/or a minimal perturbation of the phase distribution of the filtered illumination. An angularly resolved scatterometer is generally described in U.S. Patent Application Publication No. 2009/0262366, published on Oct. 22, 2009, which is incorporated herein by reference in its entirety.

Additionally, it is noted that tunable spectral filters may be utilized in a wide range of applications. Accordingly, the spirit and scope of the present disclosure may extend to any application of a tunable spectral filter.

FIG. 1 is a conceptual view of a tunable broadband illumination source 100 including a tunable spectral filter 101, in accordance with one or more embodiments of the present disclosure. In one embodiment, the tunable broadband illumination source 100 includes an illumination source 102 configured to generate an illumination beam 104 having spectral content including multiple wavelengths, a first tunable dispersive element 106 to introduce spectral dispersion to the illumination beam 104, a spatial filtering element 108 to filter the illumination beam based on the distribution of the spectrum at the focal plane, and a second tunable dispersive element 110 to remove the dispersion introduced by the first tunable dispersive element 106 from the illumination beam 104. For example, the first tunable dispersive element 106 may spectrally disperse the illumination beam 104 such that the spectrum of the illumination beam 104 may be spatially distributed across the beam profile. The spatial filtering element 108 may selectively pass or block portions of the spectrum of the illumination beam. In this regard, a spectral transmittance of the tunable spectral filter 101 may be related to a spatial transmittance of the spatial filtering element 108. Further, the second tunable dispersive element 110 may remove the spectral dispersion introduced by the first tunable dispersive element 106 such that the spectrum of the illumination beam 104 is no longer spatially distributed across the beam profile. For example, the dispersion of the second tunable dispersive element 110 may be dynamically adjusted to correspond to the dispersion of the first tunable dispersive element 106 to remove the dispersion introduced by the first tunable dispersive element 106. Accordingly, the tunable spectral filter 101 may filter the spectral content of the illumination beam 104 without modifying additional beam characteristics (e.g., divergence angle, or the like).

The spectral transmittance of the tunable spectral filter 101 may be tuned by various methods. In one embodiment, adjusting the dispersion of the first tunable dispersive element 106 may modify the spatial distribution of the spectrum of the illumination beam 104 on the spatial filtering element 108 to control which wavelengths of the spectrum of the illumination beam 104 are passed. In another embodiment, adjusting the spatial transmittance of the spatial filtering element 108 (e.g. a position of one or more edges, or the like) may modify the portions of the spectrum of the illumination beam 104 that are passed by the tunable spectral filter 101.

In another embodiment, the tunable spectral filter 101 includes a controller 112 communicatively coupled to at least one of the first tunable dispersive element 106, the second tunable dispersive element 110, or the spatial filtering element 108. In this regard, the controller 112 may provide one or more signals to one or more components to tune the spectral content of the filtered illumination beam 104. For example controller 112 may provide one or more signals to modify the dispersion characteristics of the first tunable dispersive element 106 and/or second tunable dispersive element 110 in order to modify the distribution of the spectrum of the illumination beam 104 on the spatial filtering element 108. By way of another example, the controller 112 may adjust the spatial transmittance distribution of the spatial filtering element 108 to control the spectral distribution of the filtered (e.g. passed) illumination beam 104.

The illumination source 102 may be any type of illumination source known in the art suitable for providing an illumination beam 104 having multiple wavelengths of illumination. The illumination source 102 may include, but is not limited to, a white light source (e.g. a broadband light source with a spectrum including visible wavelengths), a laser source, an arc lamp, an electrode-less lamp, or a laser sustained plasma (LSP) source. In one embodiment, the illumination source 102 is a broadband light source having high spatial coherence. For example, the illumination source 102 may include a supercontinuum laser (e.g. a white light laser). By way of another example, the illumination source 102 may include a broadband source with relatively low spatial coherence coupled with a spatial filter to provide an illumination beam 104 having high spatial coherence. Further, the spectral content of the illumination beam 104 may include any range of wavelengths of light including, but not limited to, ultraviolet (UV) radiation, visible radiation, or infrared (IR) radiation.

In another embodiment, the first tunable dispersive element 106 of the tunable spectral filter 101 may introduce spatial dispersion to the illumination beam 104. In this regard, the illumination beam 104 exiting the first tunable dispersive element 106 may have spatial chirp such that the spectrum of the illumination beam 104 is distributed across the beam profile. For example, the first tunable dispersive element 106 may introduce angular dispersion to the illumination beam 104 such that the exit angle of illumination beam 104 from the first tunable dispersive element 106 varies according to spectral content (e.g. wavelength). By way of illustration, as shown in FIG. 1, an illumination beam 104 including three distinct wavelengths incident on the first tunable dispersive element 106 may be dispersed into distinct sub-beams (e.g. $\lambda_1$, $\lambda_2$, $\lambda_3$). It is noted, however, that the depiction of sub-beams associated with distinct wavelengths illustrated in FIG. 1 and described above is provided solely for illustrative purposes and should not be interpreted as limiting. For example, the illumination beam 104 may include a continuous spectral range such that the spectrally-dispersed illumination beam 104 may include a continuous spectrally-dispersed beam (e.g. without distinct sub-beams).

The first tunable dispersive element 106 may be any type of dispersive element known in the art suitable for introducing spectral dispersion into the illumination beam 104. For example, the first tunable dispersive element 106 may introduce dispersion into the illumination beam 104 through any mechanism such as, but not limited to, diffraction or refraction. Further, the first tunable dispersive element 106 may be formed from transmissive and/or reflective optical elements.

In another embodiment, the first tunable dispersive element 106 includes a dynamically-generated diffraction grating. In this regard, a diffraction grating may be dynamically generated in a substrate material (e.g. a transparent optical material). Further, the dispersion of the first tunable dispersive element 106 may be dynamically modified in order to tune the tunable spectral filter 101 by adjusting the physical characteristics of the dynamically-generated diffraction grating. For example, the period or the modulation depth of a dynamically-generated diffraction grating may be adjusted (e.g. via the controller 112) to control the value of dispersion (e.g. the angles at which particular wavelengths of illumination are diffracted). By way of another example, the modulation depth of the dynamically-generated diffraction grating may be adjusted (e.g. via the controller 112) to control the efficiency of dispersion (e.g. an efficiency value at which a particular wavelength of illumination is diffracted).

For example, the first tunable dispersive element 106 may include, but is not limited to, an acousto-optic deflector (e.g. an acousto-optic modulator, or the like) on an electro-optic deflector. In one embodiment, the first tunable dispersive element 106 includes an acousto-optic deflector consisting of a solid medium coupled with a transducer configured to generate ultrasonic waves that propagate through the solid medium. Properties of the solid medium such as, but not limited to, the refractive index may be modified by the propagating ultrasonic waves such that the illumination beam 104 is diffracted upon interaction with the solid medium. Furthermore, ultrasonic waves may propagate through the solid medium at the velocity of sound in the medium and have a wavelength related to the frequency of the drive signal as well as the velocity of sound in the solid medium. Accordingly, a modulation frequency and/or a modulation strength of a transducer may be dynamically adjusted to modify the physical characteristics of the dynamically-generated diffraction grating and the corresponding dispersive properties (e.g. dispersion) of the first tunable dispersive element 106.

In another embodiment, the tunable spectral filter 101 includes a first optical element 114 (e.g. one or more lenses, or the like) to focus the spectrally-dispersed illumination beam 104 to a focal plane 116 such that the spectrum of the illumination beam 104 may be spatially distributed across the focal plane 116. For example, a first tunable dispersive element 106 including a diffraction grating may introduce angular dispersion by diffracting each wavelength of illumination of the illumination beam 104 at a different angle. The first optical element 114 may collect any diffracted order of light from the first tunable dispersive element 106 (e.g. ±1 order diffraction, ±2 order diffraction, or the like). Further, the first optical element 114 may transform the angular dispersion to a linear dispersion at the focal plane 116 such that each wavelength of illumination within the spectrum of the illumination beam 104 may be focused to a different location in the focal plane 116.

It is noted herein that the focal plane 116 may correspond to any surface along which the spectral components of the illumination beam 104 are focused. For example, the focal plane 116 may include a flat plane. By way of another example, the focal plane 116 may include a curved surface. Further, the focal plane 116 may be, but is not required to be, orthogonal to the plane of dispersion.

In another embodiment, the spatial filtering element 108 of the tunable spectral filter 101 is located at the focal plane 116. In this regard, the spatial filtering element 108 may spatially filter the spectrally-dispersed illumination beam 104. For example, the spatial filtering element 108 may have a spatial transmittance describing the transmittance of illumination (e.g. illumination of any wavelength) as a function of position. Accordingly, the spectral power of each wavelength of illumination of the illumination beam 104 may be modified according to the spatial transmittance of the spatial filtering element 108. In this regard, the spectral transmittance of the tunable spectral filter 101 may be controllable through the spatial transmittance of the spatial filtering element 108. In one instance, the spatial filtering element 108 may pass a select wavelength (or wavelength range) of the illumination beam 104 (e.g. $\lambda_2$ as illustrated in FIG. 1).

The spatial filtering element 108 may, but is not required to, have a shape corresponding to the shape of the focal plane 116. In one embodiment, a spatial filtering element 108 may have a curved shape to match a focal plane 116 including a curved surface (e.g. as determined by the first tunable dispersive element 106 and/or the first optical element 114).

In another embodiment, the tunable spectral filter 101 includes a second optical element 118 (e.g. one or more lenses, or the like) to collect the spectrally-dispersed illumination passed by the spatial filtering element 108. For example, the second optical element 118 may collect at least a portion of the spectrally dispersed and filtered illumination beam 104 from the spatial filtering element 108 and may direct the collected portion of the illumination beam 104 to the second tunable dispersive element 110. Further, the second optical element 118 may direct the collected spectrally dispersed and filtered illumination beam 104 to the second tunable dispersive element 110. In one embodiment, the second optical element 118 is complimentary to the first optical element 114. For example, the second optical element 118 may transform a linear dispersion of the spectrum of the illumination beam 104 to an angular dispersion.

In another embodiment, the second tunable dispersive element 110 removes the spectral dispersion of the illumination beam 104. For example, the second tunable dispersive element 110 may have a dispersion that may be adjusted to correspond to the dispersion of the first tunable dispersive element 106 so as to remove the spectral dispersion introduced by the first tunable dispersive element 106. For example, the first tunable dispersive element 106 and the second tunable dispersive element 110 may each include an acousto-optic deflector driven by a driving signal (e.g., provided by the controller 112) with adjustable frequency and/or amplitude to generate a diffraction grating with adjustable frequency and/or modulation depth. In this regard, the driving signals for the first tunable dispersive element 106 and second tunable dispersive element 110 may be complementary such that as the dispersion of the first tunable dispersive element 106 is tuned to control the spectral filtering characteristics of the tunable spectral filter 101, the second tunable dispersive element 110 may remove the spectral dispersion in the illumination beam 104. Further, the second tunable dispersive element 110 may be oriented with respect to the illumination beam 104 from the second optical element 118 such that the distributed spectral components of the illumination beam 104 recombine and follow a common propagation path. In this regard, the illumination beam 104 exiting the second tunable dispersive element 110 is a spectrally-filtered version of the input illumination beam 104. Further, the illumination beam 104 exiting the second tunable dispersive element 110 may be free of spatial chirp.

The first tunable dispersive element 106 and the second tunable dispersive element 110 may be, but are not required to be, a matched pair of dispersive elements such that the second tunable dispersive element 110 may remove spectral dispersion introduced by the first tunable dispersive element 106. In one embodiment, the first tunable dispersive element 106 and the second tunable dispersive element 110 are a matched pair of acousto-optic deflectors having matched driving signals. In another embodiment, the second tunable dispersive element 110 does not match the first tunable dispersive element 106. For example, the driving frequencies of the first tunable dispersive element 106 and the second tunable dispersive element 110 may differ (e.g. such that the first tunable dispersive element 106 and the second tunable dispersive element 110 utilize different diffraction orders, or the like). By way of another example, the driving signal of the second tunable dispersive element 110 may be adjusted to remove dispersion associated with additional components of the tunable spectral filter 101 such as, but not limited to, the first optical element 114, the second optical element 118, or the spatial filtering element 108. By way of a further example, the first tunable dispersive element 106 and the second tunable dispersive element 110 may have different operational principles (e.g. acousto-optic deflection, electro-optic deflection, or the like).

In another embodiment, the first optical element 114 and the second optical element 118 form an optical relay system. For example, the first optical element 114 and the second optical element 118 may form an afocal optical relay (e.g. an afocal pupil relay, or the like). In this regard, the first optical element 114 and the second optical element 118 may relay the distribution of the illumination beam 104 at the first tunable dispersive element 106 to the second tunable dispersive element 110. For example, a collimated illumination beam 104 may be incident on the first tunable dispersive element 106 and a collimated and spectrally filtered illumination beam 104 may exit the second tunable dispersive element 110. Accordingly, the tunable spectral filter 101 may minimally affect the properties of the illumination beam 104 such as, but not limited to, the divergence (e.g. degree of collimation), spatial coherence, or brightness (e.g. of the passed wavelengths), which may facilitate the integration of the tunable spectral filter 101 into any system (e.g. a metrology system, or the like).

The spatial filtering element 108 may have any spatial transmittance distribution in order to provide any filtering operation known in the art. Accordingly, the tunable spectral filter 101 may operate as any type of spectral filter such as, but not limited to, a low-pass filter, a high-pass filter, a band-pass filter, or a notch-filter. FIGS. 2A through 2D are illustrative top views of a spatial filtering element 108 corresponding to different filtering operations. For example, the first tunable dispersive element 106 may spectrally disperse the illumination beam 104 along the X-direction such that the wavelength of the illumination beam 104 increases with along the positive X-direction as defined in FIGS. 2A through 2D. Accordingly, the spectral power of the illumination beam 104 may be modified according to the spatial transmittance distribution of the spatial filtering element 108 along the X-direction.

Figure 2B:
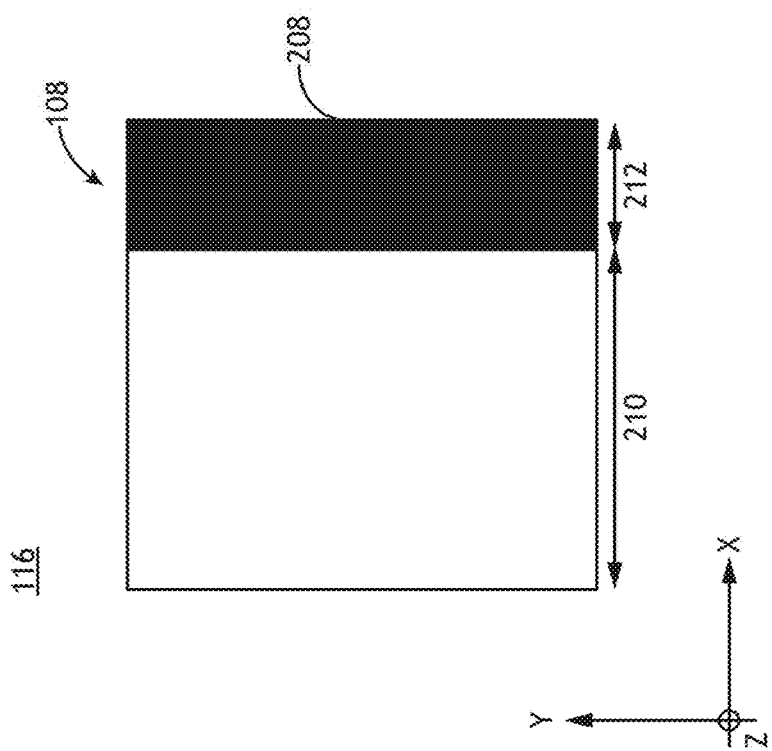
FIG. 2B is a top view of a filtering element configured as a high-pass filter, in accordance with one or more embodiments of the present disclosure.
Figure 2A:
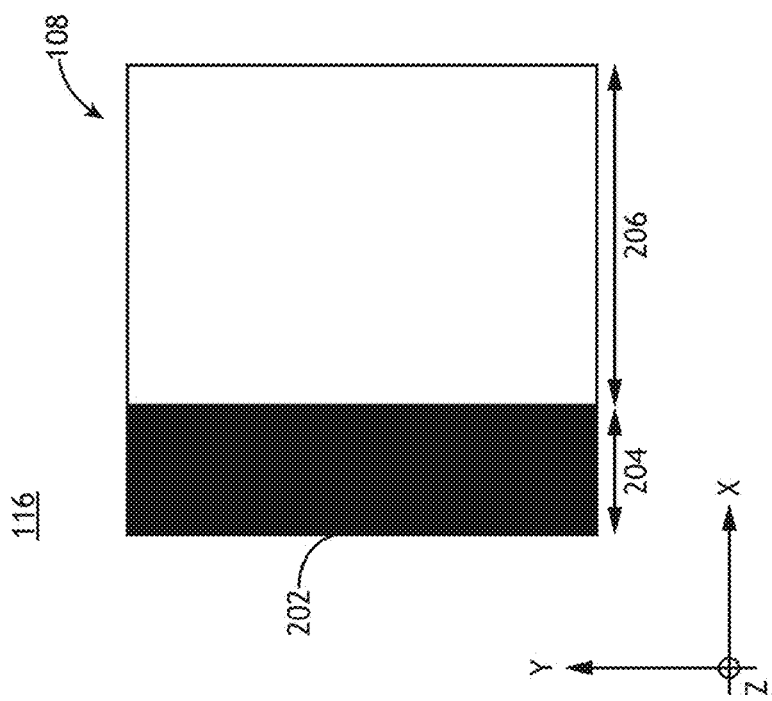
FIG. 2A is a top view of a filtering element configured as a low-pass filter, in accordance with one or more embodiments of the present disclosure.

FIG. 2A is a top view of a spatial filtering element 108 configured as a low-pass filter, in accordance with one or more embodiments of the present disclosure. In one embodiment, the spatial filtering element 108 includes a low-pass filtering segment 202 to reject illumination distributed within a rejection band 204 along the X-direction of the focal plane 116. Conversely, illumination within a pass band 206 may be passed by the spatial filtering element 108. In this regard, the spatial filtering element 108 may selectively pass wavelengths of the illumination beam 104 located with the range 206. Further, the cutoff wavelength between passed and rejected illumination may be tuned. For example, the controller 112 may direct the first tunable dispersive element 106 to modify the angular distribution of wavelengths (e.g. by modifying the pitch of a dynamically-generated diffraction grating, or the like) to control the distribution of wavelengths within the pass range 206. By way of another example, the controller 112 may direct the spatial filtering element 108 to modify the position of the low-pass filtering segment 202 within the focal plane 116 to control the distribution of wavelengths within the pass range 206.

FIG. 2B is a top view of a spatial filtering element 108 configured as a high-pass filter, in accordance with one or more embodiments of the present disclosure. In one embodiment, the spatial filtering element 108 includes a high-pass filtering segment 208 to pass illumination distributed within a pass band 210 along the X-direction of the focal plane 116. Conversely, illumination within a rejection band 212 may be rejected by the spatial filtering element 108. In this regard, the spatial filtering element 108 may selectively pass wavelengths of the illumination beam 104 located with the pass band 210. Further, the cutoff wavelength between passed and rejected illumination may be tuned. For example, the controller 112 may direct the first tunable dispersive element 106 to modify the angular distribution of wavelengths (e.g. by modifying the pitch of a dynamically-generated diffraction grating, or the like) to control the distribution of wavelengths within the pass band 210. By way of another example, the controller 112 may direct the spatial filtering element 108 to modify the position of the low-pass filtering segment 202 within the focal plane 116 to control the distribution of wavelengths within the pass band 210.

Figure 2C:
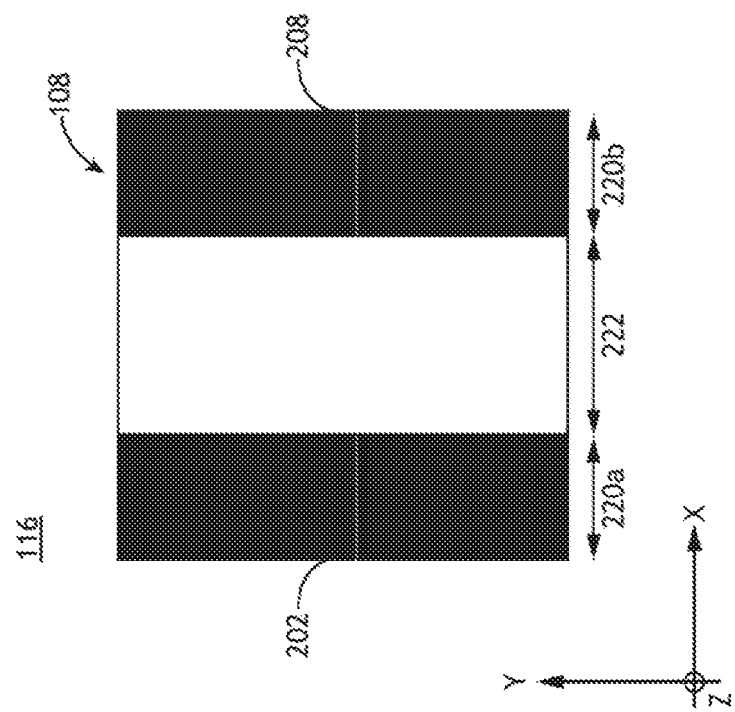
FIG. 2C is a top view of a filtering element configured as a notch filter, in accordance with one or more embodiments of the present disclosure.

FIG. 2C is a top view of a spatial filtering element 108 configured as a notch filter, in accordance with one or more embodiments of the present disclosure. In one embodiment, the spatial filtering element 108 includes a notch filtering segment 214 to reject illumination distributed within a rejection band 216 along the X-direction of the focal plane 116. Conversely, illumination within pass bands 218a,b may be passed by the spatial filtering element 108. In this regard, the spatial filtering element 108 may selectively pass wavelengths of the illumination beam 104 located with the pass bands 218a,b. Further, the cutoff wavelengths between passed and rejected illumination may be tuned. For example, the controller 112 may direct the first tunable dispersive element 106 to modify the angular distribution of wavelengths (e.g. by modifying the pitch of a dynamically-generated diffraction grating, or the like) to control the distribution of wavelengths within the pass bands 218a,b. By way of another example, the controller 112 may direct the spatial filtering element 108 to modify the position of the low-pass filtering segment 202 within the focal plane 116 to control the distribution of wavelengths within the pass bands 218a,b. Further, a spatial filtering element 108 may include any number of additional notch filtering segments 214 to selectively reject illumination in the focal plane 116.

Figure 2D:
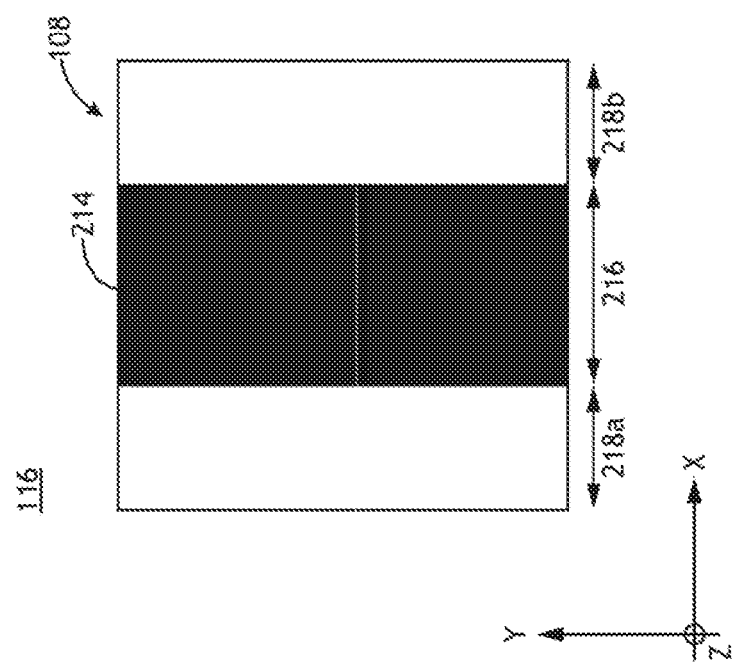
FIG. 2D is a top view of a filtering element configured as a band-pass filter, in accordance with one or more embodiments of the present disclosure.

FIG. 2D is a top view of a spatial filtering element 108 configured as a band-pass filter, in accordance with one or more embodiments of the present disclosure. In one embodiment, the spatial filtering element 108 includes a low-pass filtering segment 202 to reject illumination distributed within a rejection band 220a along the X-direction of the focal plane 116 and a high-pass filtering segment 208 to reject illumination distributed within a rejection band 220b. Conversely, illumination within a pass band 222 may be passed by the spatial filtering element 108. In this regard, the spatial filtering element 108 may selectively pass wavelengths of the illumination beam 104 located with the pass band 222. Further, the cutoff wavelengths (e.g. low-pass and high-pass cutoff wavelengths) between passed and rejected illumination may be tuned. For example, the controller 112 may direct the first tunable dispersive element 106 to modify the angular distribution of wavelengths (e.g. by modifying the pitch of a dynamically-generated diffraction grating, or the like) to control the distribution of wavelengths within the pass band 222. By way of another example, the controller 112 may direct the spatial filtering element 108 to modify the position of the low-pass filtering segment 202 and/or the high-pass filtering segment 208 within the focal plane 116 to control the distribution of wavelengths within the pass band 222. In one instance, the controller 112 may modify the separation between the low-pass filtering segment 202 and the high-pass filtering segment 208 to adjust the width of the pass band 222 and, correspondingly, the bandwidth of passed illumination. In another instance, the controller 112 may simultaneously translate the low-pass filtering segment 202 and the high-pass filtering segment 208 to modify the central wavelength of the illumination beam 104 to pass through the band-pass filter.

Figure 3A:
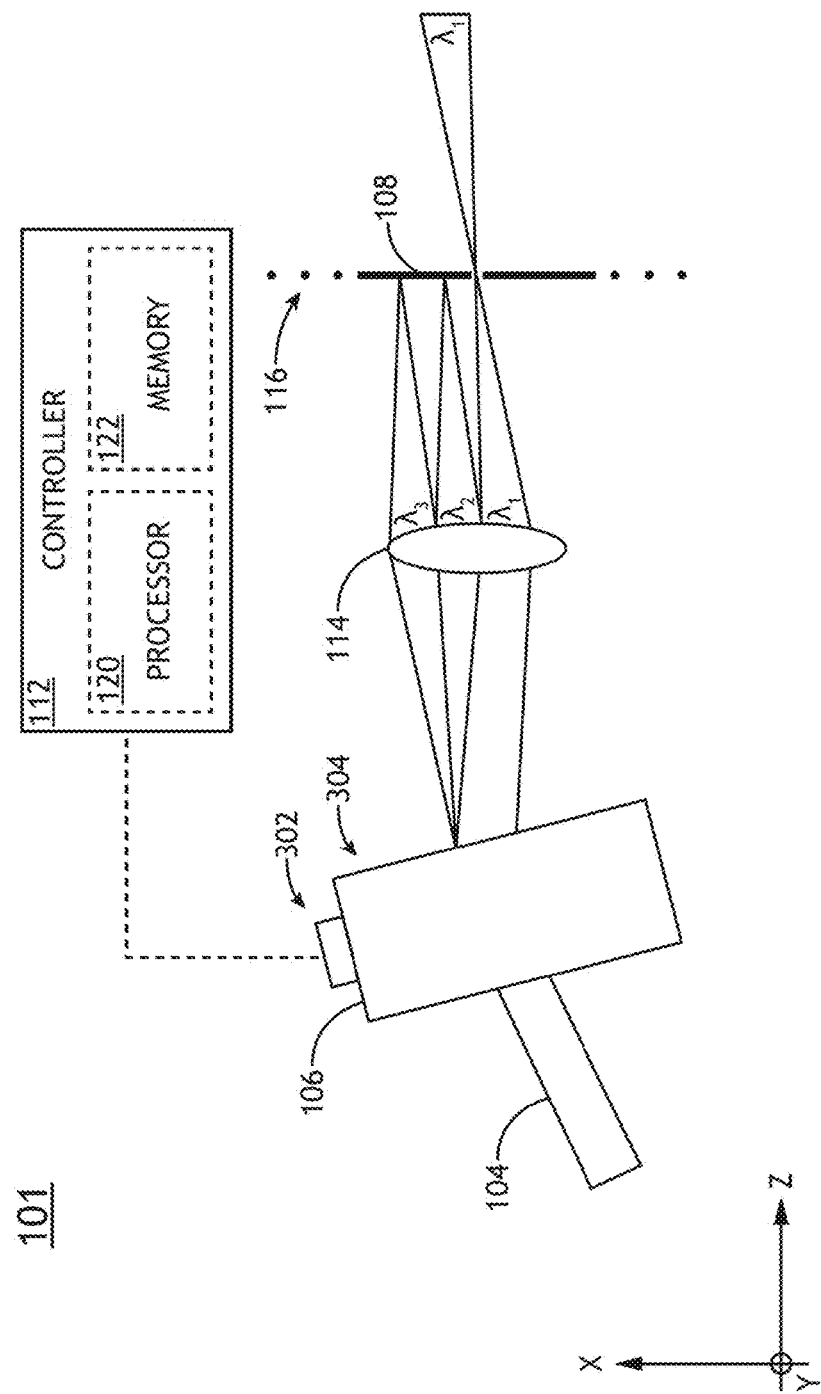
FIG. 3A is a schematic view of a portion of a tunable spectral filter passing a first select wavelength, in accordance with one or more embodiments of the present disclosure.
Figure 3B:
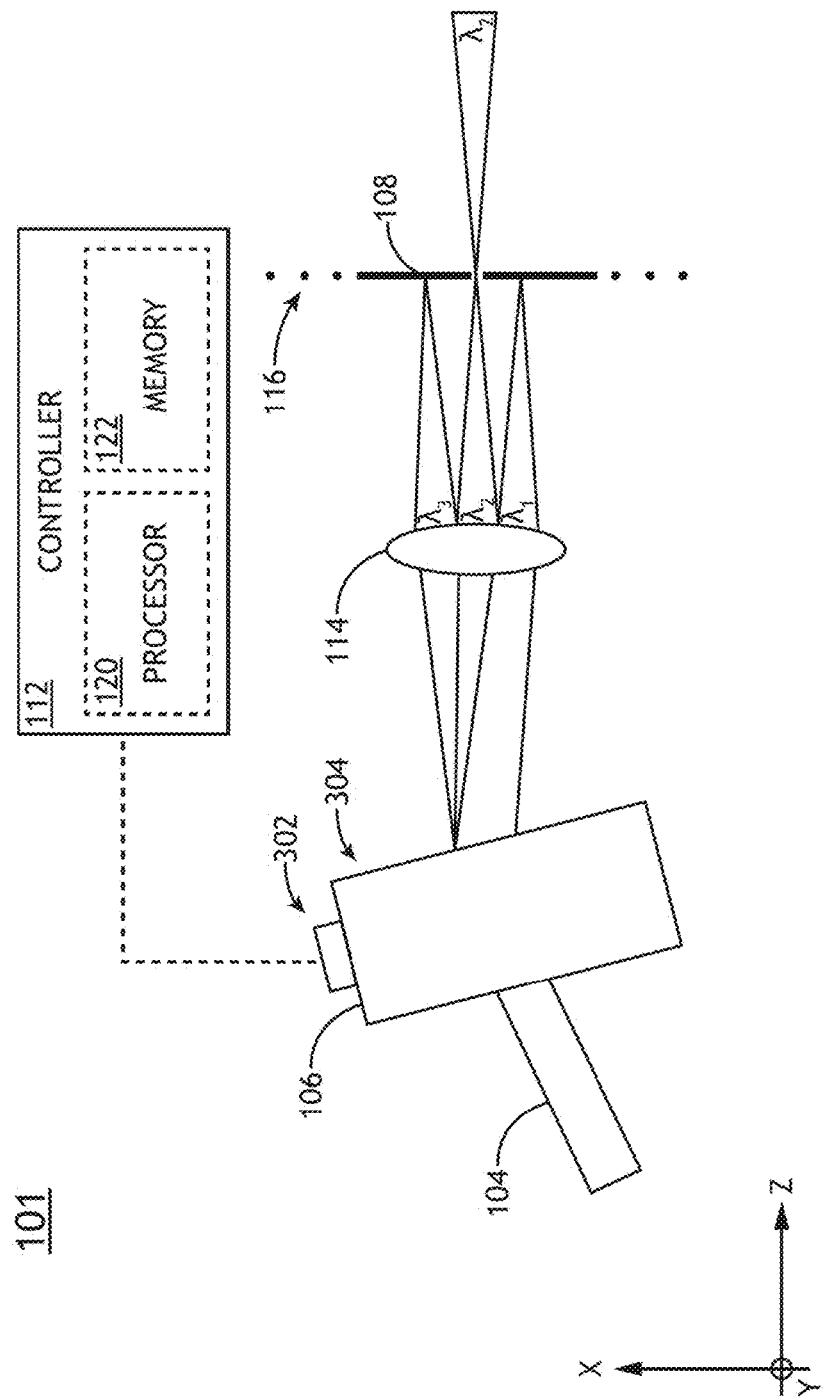
FIG. 3B is a schematic view of a portion of a tunable spectral filter passing a second select wavelength, in accordance with one or more embodiments of the present disclosure.
Figure 3C:
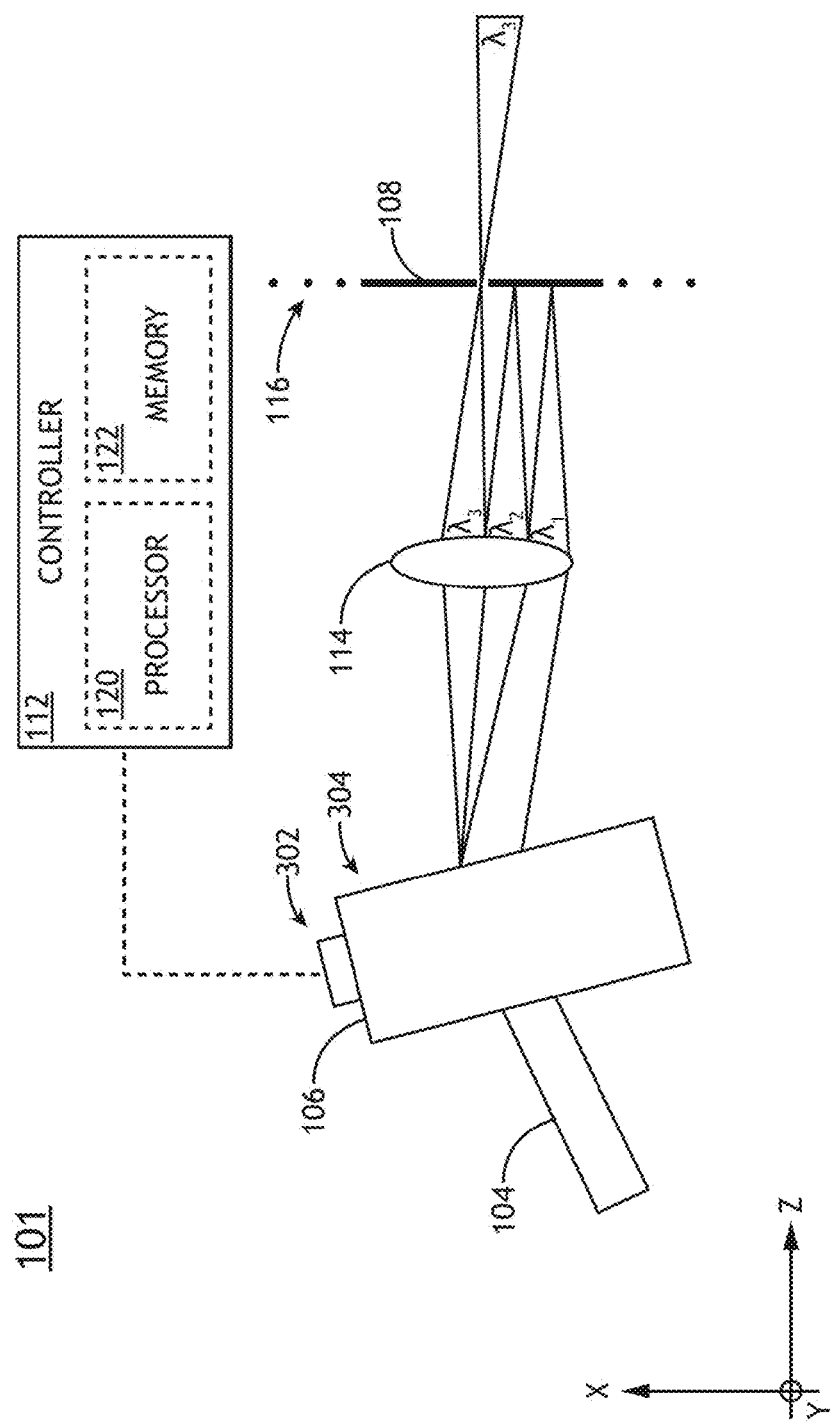
FIG. 3C is a schematic view of a portion of a tunable spectral filter passing a third select wavelength, in accordance with one or more embodiments of the present disclosure.

FIGS. 3A through 3C are schematic views of a portion of a tunable spectral filter 101 illustrating the tunable selection of select wavelengths of illumination of the illumination beam 104 (e.g. center wavelengths of passed illumination). FIG. 3A is a schematic view of a portion of a tunable spectral filter 101 passing a first select wavelength ($\lambda_1$), in accordance with one or more embodiments of the present disclosure. FIG. 3B is a schematic view of a portion of a tunable spectral filter 101 passing a second select wavelength ($\lambda_2$), in accordance with one or more embodiments of the present disclosure. FIG. 3C is a schematic view of a portion of a tunable spectral filter 101 passing a third select wavelength ($\lambda_3$), in accordance with one or more embodiments of the present disclosure.

In one embodiment, the first tunable dispersive element 106 disperses an illumination beam 104 including three distinct wavelengths into distinct sub-beams (e.g., $\lambda_1$, $\lambda_2$, $\lambda_3$). Further, the exit angle of the sub-beams directed from the first tunable dispersive element 106 may vary according to wavelength. As illustrated in FIGS. 3A through 3C, a spatial filtering element 108 located at a focal plane 116 may spatially filter the illumination beam 104 to select a particular wavelength or range of wavelengths of the illumination beam 104. For example, spatial filtering element 108 may be configured to operate as a band-pass filter (e.g., as depicted in FIG. 2D).

In one embodiment, the first tunable dispersive element 106 includes an acousto-optic deflector. For example, the first tunable dispersive element 106 may include a transducer 302 coupled to a transparent medium 304. Further, the transducer 302 may be communicatively coupled to the controller 112. In this regard, the transducer may generate ultrasonic waves (e.g. in response to a radio-frequency (RF) signal) that propagate through the transparent medium 304 to dynamically generate a diffraction grating.

The spectrum of the illumination beam 104 passing through the spatial filtering element 108 (and thus the tunable spectral filter 101) may be adjusted (e.g. via the controller 112) by controlling the spatial distribution of wavelengths on the spatial filtering element 108 and/or the spatial transmittance of the spatial filtering element 108. In one embodiment, the controller 112 directs the first tunable dispersive element 106 to modify the pitch of the dynamically-generated diffraction grating. For example, the controller 112 may modify an RF signal to the transducer 302 to modify the frequency of ultrasonic waves propagating through the transparent medium 304 of the first tunable dispersive element 106. Accordingly, the diffraction angle of each wavelength of the illumination beam 104 may be adjusted such that the range of wavelengths of the illumination beam 104 passing through the pass-band of the spatial filtering element 108 (e.g. associated with pass band 222 illustrated in FIG. 2D) may be correspondingly adjusted. In one instance, the controller 112 provides a first RF signal having a first frequency to the transducer 302 to selectively pass the first select wavelength ($\lambda_1$) as illustrated in FIG. 3A. In another instance, the controller 112 provides a second RF signal having a second frequency to the transducer 302 to selectively pass the second select wavelength ($\lambda_2$) as illustrated in FIG. 3B. In another instance, the controller 112 provides a third RF signal to the transducer 302 having a third frequency to selectively pass the third select wavelength ($\lambda_3$) as illustrated in FIG. 3C.

In another embodiment, the controller 112 may simultaneously direct the spatial filtering element 108 to modify a position of the low-pass filtering segment 202 and/or the high-pass filtering segment 208 to further control the spectrum of the illumination beam 104. For example, the controller 112 may control the center wavelength of the illumination beam 104 passing through the spatial filtering element 108 by adjusting the dispersion of the first tunable dispersive element 106 and may further control the bandwidth of the illumination beam 104 passing through the spatial filtering element 108 by adjusting the separation between the low-pass filtering segment 202 and the high-pass filtering segment 208.

In some embodiments, a tunable spectral filter 101 may include multiple stages of spatial filtering to modify the spectral content of the illumination beam 104. Accordingly, the tunable spectral filter 101 may include multiple filtering elements 108 located at multiple focal planes 116.

Figure 4:
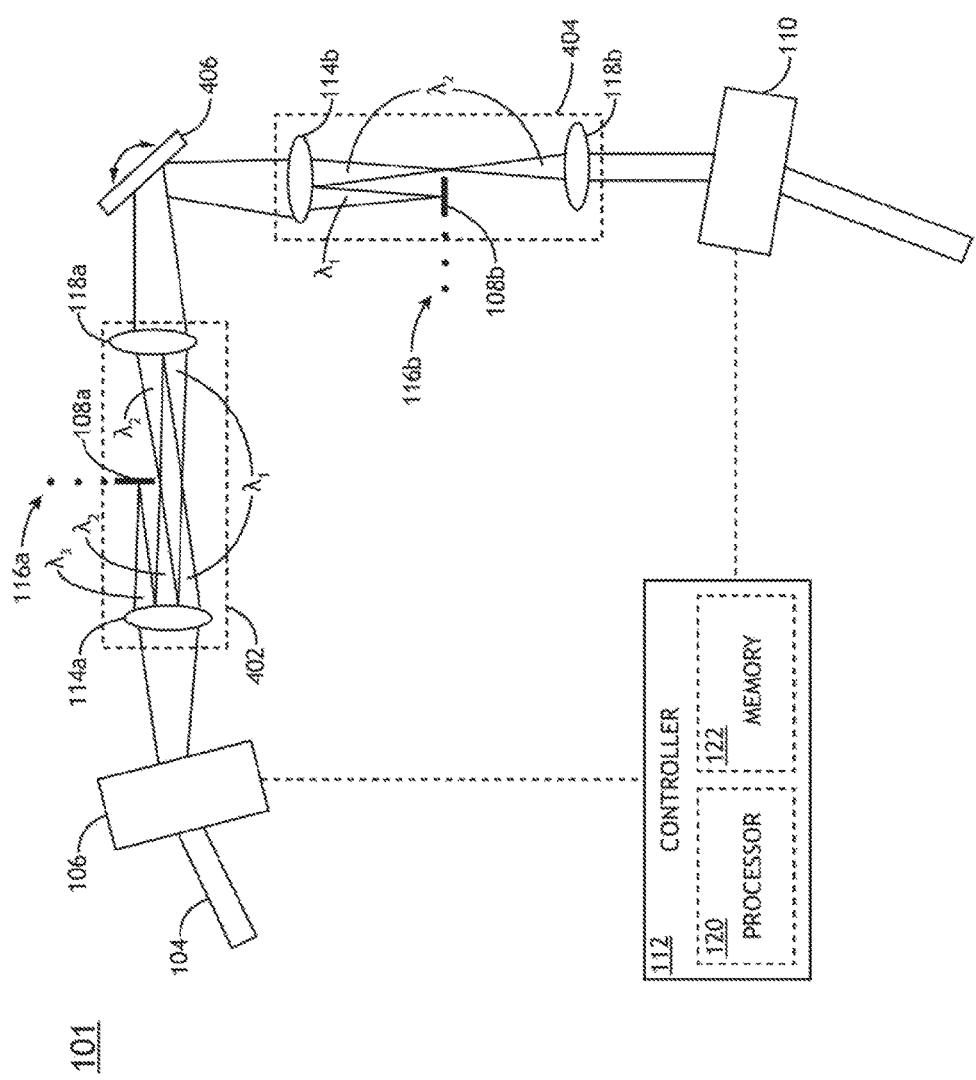
FIG. 4 is a conceptual view of a tunable spectral filter including a first filtering stage to provide a low-pass filter and a second filtering stage to provide a high-pass filter, in accordance with one or more embodiments of the present disclosure.

FIG. 4 is a conceptual view of a tunable spectral filter 101 including a first filtering stage 402 to provide a low-pass filter and a second filtering stage 404 to provide a high-pass filter, in accordance with one or more embodiments of the present disclosure. In one embodiment, the first tunable dispersive element 106 disperses an illumination beam 104 including three distinct wavelengths into distinct sub-beams (e.g. $\lambda_1$, $\lambda_2$, $\lambda_3$). Further, the exit angle of the sub-beams directed from the first tunable dispersive element 106 may vary according to wavelength. In another embodiment, a first optical element 114a focuses the spectrally-dispersed illumination beam 104 onto a first focal plane 116a. In another embodiment, a first filtering element 108a located at the first focal plane 116a provides low-pass filtering of the illumination beam 104. For example, as illustrated in FIG. 4, the first focal filtering element 108a may be configured as depicted in FIG. 2A such that one selected wavelength ($\lambda_3$) of the illumination beam 104 is located in a rejection band, whereas remaining wavelengths ($\lambda_1$, $\lambda_2$) of the illumination beam 104 are located in a pass band. In another embodiment, a second optical element 118a collects the spectrally-dispersed illumination beam 104.

In another embodiment, the tunable spectral filter 101 includes a first optical element 114b of the second stage. For example, a first optical element 114b may focus the spectrally-dispersed illumination beam 104 onto a second focal plane 116b. In another embodiment, a second filtering element 108b located at the second focal plane 116b provides high-pass filtering of the illumination beam 104. For example, as illustrated in FIG. 4, the second filtering element 108b may be configured as depicted in FIG. 2B such that one selected wavelength ($\lambda_1$) of the illumination beam 104 is located in a rejection band, whereas the remaining wavelength ($\lambda_2$) of the illumination beam 104 is located in a pass band. In another embodiment, the tunable spectral filter 101 includes a second optical element 118b to collect the spectrally-dispersed illumination beam. In this regard, the tunable spectral filter 101 may select a single wavelength ($\lambda_2$) through two filtering stages.

In another embodiment, the tunable spectral filter 101 includes a beam steering element 406 located prior to the first optical element 114b of the second stage. The beam steering element 406 may control the spectral distribution of the illumination beam 104 in the second focal plane 116b (e.g., to control the high-pass cutoff wavelength). The beam steering element 406 may be any type of beam steering element known in the art. For example, the adjustable mirror 406 may include a mirror mounted in on a translation stage such as, but not limited to, a rotational translation stage or a linear translation stage. Further, the translation stage may be any type of translation stage known in the art such as, but not limited to, a stepper motor stage, a servo motor stage, a piezo-electric transducer, a galvanometer mirror or the like). By way of another example, the adjustable mirror 406 may be a dynamically controllable mirror such as, but not limited to, a deformable mirror or a micro-mirror array.

It is noted herein that the depiction of sub-beams associated with distinct wavelengths illustrated in FIGS. 3A through 4 and described above is provided solely for illustrative purposes and should not be interpreted as limiting. For example, the illumination beam 104 may include a continuous spectral range such that the spectrally-dispersed illumination beam 104 may include a continuous spectrally-dispersed beam (e.g. without distinct sub-beams). Accordingly, a spatial filtering element 108 may pass a continuous range of wavelengths associated with a pass-band. Further, a spatial filtering element 108 including multiple pass-bands may pass multiple wavelength ranges.

Referring again to FIG. 1, in one embodiment, the illumination source 102 may include any multi-wavelength illumination source known in the art. For example, the illumination source 102 may include, but is not limited to, a white-light laser source or a supercontinuum laser source. Additionally, the illumination beam 104 may be delivered via free-space propagation or guided light (e.g. an optical fiber, a light pipe, or the like).

It is noted that any of the dispersive elements (e.g. first tunable dispersive element 106 and/or the second tunable dispersive element 110) may include any type of dispersive element known in the art. Accordingly, the descriptions of dynamically generated diffraction gratings above are provided solely for illustrative purposes and should not be interpreted as limiting. For example, any of the dispersive elements may be formed from fixed (e.g. fabricated, or the like) dispersive elements. In one instance, any of the dispersive elements may include a prism to spectrally disperse the illumination beam 104 by refracting the illumination beam 104 at different angles according to spectral content (e.g. wavelength). In this regard, the dispersive properties of the prism may be modified (e.g. in response to a signal from the controller 112) by translating (e.g. rotating, or the like) the prism. In another instance, any of the dispersive elements may include a fixed diffractive optical element to spectrally disperse (or spectrally combine) the illumination beam 104 through diffraction. For example, a dispersive element may include any type of diffraction grating such as, but not limited to, a holographic grating, a ruled grating, or a blazed grating.

In another embodiment, the function of the first tunable dispersive element 106 and the first optical element 114 may be accomplished using a single physical component such as a curved diffraction grating that introduces spatial dispersion into the illumination beam 104 and simultaneously focuses the illumination beam 104 at the focal plane 116. Similarly, the functions of the second tunable dispersive element 110 and the second optical element 118 may be accomplished using a single physical component.

It is noted that the spatial filtering element 108 may include any type of spatial filter known in the art. In some embodiments, the spatial filter is formed from one or more non-transparent (e.g. fully reflecting and/or absorbing) materials with a well-defined edge (e.g. a "knife-edge," or the like). For example, a low-pass filtering segment 202, a high-pass filtering segment 208, a notch filtering segment 214, or the like may be formed from one or more "knife-edges." It is further noted that a well-defined edge may provide a sharp transition between passed and rejected wavelengths and thus high spectral resolution. As another example, the spatial filtering element 108 may be formed by an aperture including one or more openings. In this regard, passed wavelengths of the illumination beam 104 may propagate through the one or more openings of the aperture.

In some embodiments, one or more of the blocking elements (e.g. filtering segments) may be translated (e.g. in response to a signal from the controller 112) to select particular wavelengths of the illumination beam 104 to propagate through a pass-band of the spatial filtering element 108. For example, one or more filtering segments may be secured to one or more translational stages (not shown) communicatively coupled to the controller 112. The translational stages may be any type of translational stages known in the art suitable for manipulating the position of the filtering segments. For instance, filtering elements may be secured linear translation stages driven by a stepper motor, a servo motor, a piezo-electric transducer, a galvanometer actuator, or the like.

In another embodiment, the spatial filtering element 108 includes an apodizing element. For example, an apodizing element may include a one or more portions with a gradient transmission profile such that the amplitude of passed illumination may vary gradually. In this regard, an apodizing element may facilitate a smooth spectral profile and/or compensate for variations in the diffraction efficiency of a diffractive element (e.g. the first tunable dispersive element 106 configured as a diffraction grating, or the like). Further, an apodizing element may reduce unwanted optical effects such as, but not limited to, diffraction effects or windowing effects associated with the interaction between the spatial filtering element 108 and the illumination beam 104.

In another embodiment, the spatial filtering element 108 may provide a pixelated filtering element. In this regard, the spatial filtering element 108 may provide a dynamically addressable spatial transmittance function to selectively modify the amplitude of multiple locations (e.g. corresponding to multiple wavelengths). For example, the spatial filtering element 108 may include a spatial light modulator communicatively coupled to the controller 112. The spatial light modulator may contain individually addressable regions, or pixels, that can be configured using the controller 112 to pass or reject wavelengths incident on each pixel. Such a spatial light modulator may operate in either transmission mode in which selected passed wavelengths are directed through the spatial light modulator or reflection mode in which selected passed wavelengths are reflected. By way of another example, the spatial filtering element 108 may include a microelectromechanical system (MEMS) device or a nanoelectromechanical system (NEMS) device that can be configured to pass select wavelengths according to spatial distribution of the spectrum of the illumination beam 104. In one instance, the spatial filtering element 108 may include, but is not limited to, a deformable mirror or a micro-mirror device. In this regard, selected wavelengths to be passed may be directed to subsequent elements in the system such as the second optical element 118, while the remaining wavelengths are reflected away from the spatial filtering element 108 (e.g., reflected to a beam block or baffle).

In some embodiments, the number of physical elements in the tunable spectral filter 101 can be reduced by utilizing a configuration that is optically symmetric around a spatial filtering element 108. In this regard, the spatial filtering element 108 may be configured to operate in a reflective mode. Accordingly, the passed wavelengths may be reflected from the spatial filtering element 108 and propagate back through the first tunable dispersive element 106 along a mirrored optical path such that the spatial dispersion in the illumination beam 104 introduced by the first tunable dispersive element 106 is removed. Further, a spectrally-filtered output illumination beam 104 may be selected and differentiated from the input illumination beam 104 through any method known in the art. For example, the tunable spectral filter 101 may include a polarizing beam splitter and a quarter-wave plate for selected wavelengths such that the selected wavelengths passed by the spatial filtering element 108 are deflected along a different optical path than the input illumination beam 104 upon interaction with the polarizing beam splitter on the second pass.

In another embodiment, the controller 112 includes one or more processors 120. In another embodiment, the one or more processors 120 are configured to execute a set of program instructions maintained in a memory medium 122, or memory. Further, the controller 112 may include one or more modules containing one or more program instructions stored in the memory medium 122 executable by the one or more processors 120. The one or more processors 120 of a controller 112 may include any processing element known in the art. In this sense, the one or more processors 120 may include any microprocessor-type device configured to execute algorithms and/or instructions. In one embodiment, the one or more processors 120 may consist of a desktop computer, mainframe computer system, workstation, image computer, parallel processor, or any other computer system (e.g., networked computer) configured to execute a program configured to operate the tunable spectral filter 101, as described throughout the present disclosure. It is further recognized that the term "processor" may be broadly defined to encompass any device having one or more processing elements, which execute program instructions from a non-transitory memory medium 122.

It is recognized herein that the steps described throughout the present disclosure may be carried out by the controller 112. Further, the controller 112 may be formed from a single component or multiple components. It is further noted herein that the multiple components of the controller 112 may be housed in a common housing or within multiple housings. In this way, any controller or combination of controllers may be separately packaged as a module suitable for integration into the tunable spectral filter 101.

The memory medium 122 may include any storage medium known in the art suitable for storing program instructions executable by the associated one or more processors 120. For example, the memory medium 122 may include a non-transitory memory medium. As an additional example, the memory medium 122 may include, but is not limited to, a read-only memory, a random access memory, a magnetic or optical memory device (e.g., disk), a magnetic tape, a solid state drive and the like. It is further noted that memory medium 122 may be housed in a common controller housing with the one or more processors 120. In one embodiment, the memory medium 122 may be located remotely with respect to the physical location of the one or more processors 120 and controller 112. For instance, the one or more processors 120 of controller 112 may access a remote memory (e.g., server), accessible through a network (e.g., internet, intranet and the like). Therefore, the above description should not be interpreted as a limitation on the present invention but merely an illustration.

Figure 5:
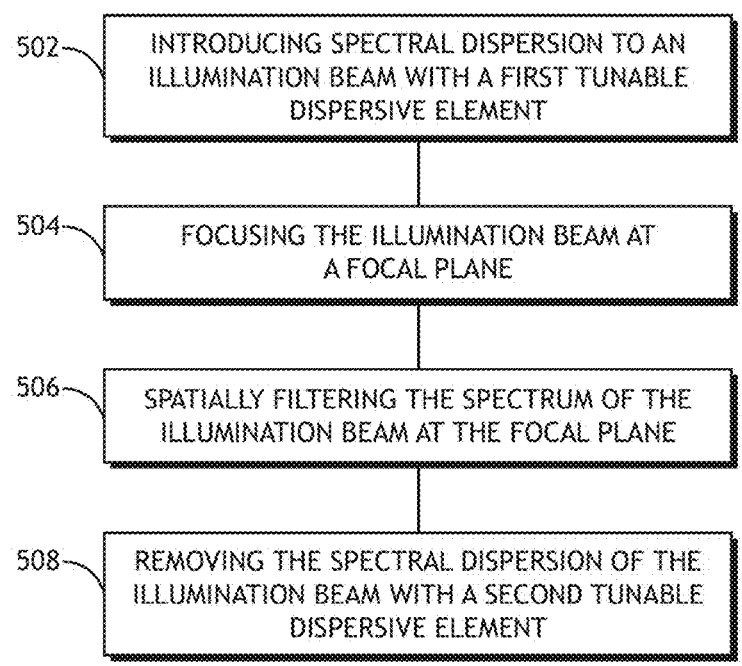
FIG. 5 is a flow diagram illustrating steps performed in a method for tuning a broadband illumination source, in accordance with one or more embodiments of the present disclosure.

FIG. 5 is a flow diagram illustrating steps performed in a method 500 for tuning a broadband illumination source, in accordance with one or more embodiments of the present disclosure. Applicant notes that the embodiments and enabling technologies described previously herein in the context of tunable spectral filter 101 should be interpreted to extend to method 500. It is further noted, however, that the method 500 is not limited to the architecture of tunable spectral filter 101.

In one embodiment, the method 500 includes a step 502 of introducing spectral dispersion to an illumination beam with a first tunable dispersive element. For example, an illumination beam having a broadband spectral distribution may be spectrally dispersed by a first tunable dispersive element (e.g. a diffraction grating, or the like) such that different spectral components (e.g. different wavelengths) propagate along different paths. In another embodiment, a dispersion of the first tunable dispersive element is adjustable. For example, the first tunable dispersive element may include a dynamically-generated diffraction grating (e.g. an acousto-optic deflector, an electro-optic deflector, or the like) such that the pitch and/or the modulation depth of the dynamically-generated diffraction grating may be adjusted.

In another embodiment, the method 500 includes a step 504 of focusing the spectrally-dispersed illumination beam at a focal plane. For example, the spectrally-dispersed illumination beam may be collected and focused to a focal plane by an optical element (e.g. a lens). Further, a distribution of a spectrum of the illumination beam at the focal plane may be controllable by adjusting the dispersion of the first tunable dispersive element. In this regard, the dispersion of the first dispersive element may be adjusted to control the distribution of the spectrum of the spectrally-dispersed illumination beam at the focal plane and thus the filtered spectrum of the illumination beam exiting the filter.

In another embodiment, the method 500 includes a step 506 of spatially filtering the spectrum of the illumination beam at the focal plane. For example, a spatial filter located at the focal plane may have a spatial transmittance distribution describing the transmitted power as a function of position on the spatial filter. In this regard, the spatial transmittance of the spatial filter may control the spectral transmittance of the spectrally-dispersed illumination beam. The final filtered spectrum of the illumination beam exiting the filter may be tuned by adjusting the dispersion of the first tunable dispersive element and/or the configuration of the spatial filter. For example, a center wavelength and a bandwidth of a broadband illumination source may be tuned by adjusting the dispersion of the first tunable dispersive element to provide a desired center wavelength on the center of a spatial filter including an aperture and further adjusting the width of the aperture to control the bandwidth of the passed illumination.

In another embodiment, the method 500 includes a step 508 of removing the spectral dispersion of the illumination beam with a second tunable dispersive element. For example, a second dispersive element (e.g. with dispersion characteristics complementary to the dispersive element) may have a similar dispersion as the first tunable dispersive element and may further be oriented such that the spatially distributed spectral components may be combined to propagate along a common propagation path. In this regard, the beam characteristics of the illumination beam (e.g. divergence angle, or the like) exiting the second tunable dispersive element may match the beam characteristics of the illumination beam incident on the first tunable dispersive element.

Figure 6:
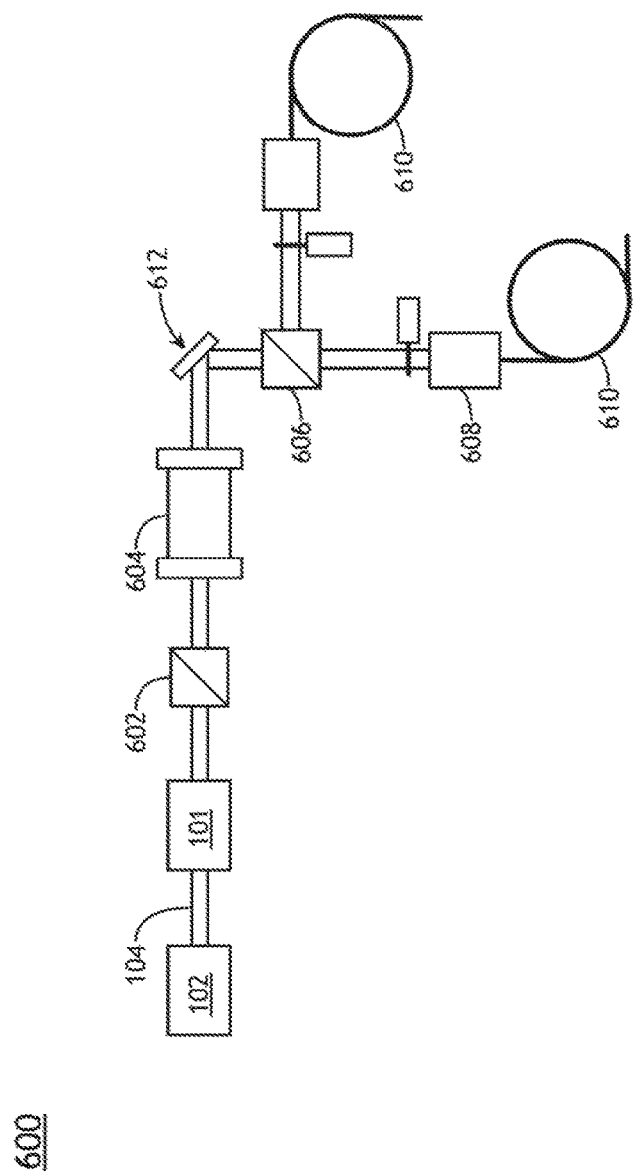
FIG. 6 is a block diagram illustrating a tunable illumination source including a tunable spectral filter, in accordance with one or more embodiments of the present disclosure.

FIG. 6 is a block diagram illustrating a tunable illumination source 600 including a tunable spectral filter 101, in accordance with one or more embodiments of the present disclosure. In one embodiment, the tunable illumination source 600 includes a broadband illumination source 102 configured to generate an illumination beam 104 having a broad spectrum (e.g. a white light spectrum, a spectrum from a generated supercontinuum, or the like). In another embodiment, the tunable illumination source 600 includes a tunable spectral filter 101 to selectively provide a spectrally filtered illumination beam 104.

In another embodiment, the tunable illumination source 600 includes a first polarizer 602 to linearly polarize the spectrally-filtered illumination beam 104. In another embodiment, the tunable illumination source 600 includes a polarization rotator 604 (e.g., a Pockels cell, or the like) to controllably modify the polarization of the spectrally-filtered illumination beam 104. In this regard, the spectrally-filtered illumination beam 104 may have a linear polarization rotated to any desired angle. In another embodiment, the tunable illumination source 600 includes a second polarizer 606. In this regard, the second polarizer 606 may split the spectrally-filtered illumination beam 104 into two beams with orthogonal polarization (e.g., s and p polarization, or the like). For example, a spectrally-filtered illumination beam 104 with a 45-degree polarization (e.g., induced by the polarization rotator 604) may split into two beams with equal power. In another embodiment, the tunable illumination source 600 includes fiber couplers 608 to couple the two spectrally-filtered illumination beams with orthogonal polarization into optical fibers 610 (e.g., polarization-maintaining optical fibers, or the like).

In another embodiment, the tunable illumination source 600 includes a translatable mirror 612 located prior to the second polarizer 606. For example, the translatable mirror 612 (e.g., a piezo-electric mirror, or the like) may provide fine positioning of the spectrally-filtered illumination beam 104 on each of the optical fibers 610. In another embodiment, the tunable illumination source 600 includes optical shutters 614 to selectively pass or block illumination to the optical fibers 610.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A tunable spectral filter, comprising:
a first tunable dispersive element, wherein a dispersion of the first tunable dispersive element is adjustable, wherein the first tunable dispersive element is configured to introduce spectral dispersion to an illumination beam;
a first optical element, the first optical element configured to receive the illumination beam from the first tunable dispersive element and focus the illumination beam at a focal plane, wherein a spatial distribution of a spectrum of the illumination beam at the focal plane is controllable by adjusting the dispersion of the first tunable dispersive element;
a spatial filtering element located at the focal plane, wherein the spatial filtering element filters a spectrum of the illumination beam based on the spatial distribution of the spectrum of the illumination beam at the focal plane to form a filtered illumination beam having a filtered spectrum;
a second optical element configured to collect the filtered illumination beam from the spatial filtering element; and
a second tunable dispersive element configured to receive the filtered illumination beam from the second optical element, wherein a dispersion of the second tunable dispersive element is configured to correspond to the dispersion of the first tunable dispersive element, wherein the second tunable dispersive element is configured to remove the spectral dispersion introduced by the first tunable dispersive element from the filtered illumination beam.

2. The tunable spectral filter of claim 1, wherein the first tunable dispersive element is configured to accept a spatially coherent illumination beam.

3. The tunable spectral filter of claim 2, wherein the spatially coherent illumination beam comprises:
a supercontinuum laser source.

4. The tunable spectral filter of claim 1, wherein at least one of the first tunable dispersive element or the second tunable dispersive element comprises:
a diffraction grating.

5. The tunable spectral filter of claim 4, wherein at least one of a pitch or a diffraction efficiency of the diffraction grating is adjustable.

6. The tunable spectral filter of claim 4, wherein the diffraction grating comprises:
at least one of an acousto-optic deflector or an electro-optic deflector.

7. The tunable spectral filter of claim 1, wherein the spatial filter includes a filtering segment to block a portion of the spectrum of the illumination beam based on the spatial distribution of the spectrum of the illumination beam on the filtering segment.

8. The tunable spectral filter of claim 7, wherein adjusting the dispersion of the first tunable dispersive element controls the portion of the spectrum of the illumination beam blocked by the filtering segment to form the filtered illumination beam.

9. The tunable spectral filter of claim 7, wherein the filtering segment comprises:
at least one of a low-pass filter or a high-pass filter.

10. The tunable spectral filter of claim 1, wherein the filtering element comprises:
an aperture to pass a portion of the spectrum of the illumination beam based on the spatial distribution of the spectrum of the illumination beam on the aperture to form the filtered illumination beam.

11. The tunable spectral filter of claim 10, wherein the aperture comprises:
a bandpass filter.

12. The tunable spectral filter of claim 10, wherein the aperture includes a first filtering segment and a second filtering segment separated by a width of the aperture, wherein the first filtering segment is configured to block a first portion of the spectrum of the illumination beam, wherein the second filtering segment is configured to block a second portion of the spectrum of the illumination beam, wherein a third portion of the spectrum of the illumination beam propagates through the aperture as the filtered illumination beam and is collected by the second optical element.

13. The tunable spectral filter of claim 12, wherein adjusting the dispersion of the first tunable dispersive element controls a center wavelength of the filtered illumination beam.

14. The tunable spectral filter of claim 10, wherein the width of the aperture is adjustable.

15. The tunable spectral filter of claim 14, wherein adjusting the width of the aperture controls a bandwidth of the filtered illumination beam.

16. The tunable spectral filter of claim 1, wherein the filtering element comprises:
at least one of a transmissive filtering element or a reflective filtering element.

17. The tunable spectral filter of claim 1, wherein the filtering element comprises:
a pixelated filtering element.

18. The tunable spectral filter of claim 17, wherein the pixelated filtering element comprises:
at least one of a spatial-light modulator, a micro-mirror array, or a deformable mirror.

19. The tunable spectral filter of claim 1, wherein the filtering element comprises:
one or more apodizing elements.

20. The tunable spectral filter of claim 1, wherein the first optical element and the second optical element comprise:
an afocal optical relay.

21. A tunable spectral filter, comprising:
a first tunable dispersive element, wherein a dispersion of the first tunable dispersive element is adjustable, wherein the first tunable dispersive element is configured to introduce spectral dispersion to an illumination beam;
a first optical element, the first optical element configured to receive the illumination beam from the first tunable dispersive element and focus the illumination beam at a first focal plane, wherein a spatial distribution of a spectrum of the illumination beam at the first focal plane is controllable by adjusting the dispersion of the first tunable dispersive element;
a first filtering segment located at the first focal plane, wherein the first filtering segment filters a spectrum of the illumination beam based on the spatial distribution of the spectrum of the illumination beam at the first focal plane;
a second optical element configured to collect the illumination beam from the first filtering segment;
a beam steering element configured to receive the illumination beam from the second optical element and adjustably modify the trajectory of the illumination beam;
a third optical element, the third optical element configured to receive the illumination beam from the beam steering element and focus the illumination beam at a second focal plane, wherein a spatial distribution of a spectrum of the illumination beam at the second focal plane is controllable by adjusting the beam steering element;
a second filtering segment located at the first focal plane, wherein the second filtering segment filters a spectrum of the illumination beam based on the spatial distribution of the spectrum of the illumination beam at the second focal plane;
a fourth optical element configured to collect the illumination beam from the second filtering segment; and
a second tunable dispersive element configured to receive the illumination beam from the fourth optical element, wherein a dispersion of the second tunable dispersive element is configured to correspond to the dispersion of the first tunable dispersive element, wherein the second tunable dispersive element is configured to remove the spectral dispersion introduced by the first tunable dispersive element from the illumination beam.

22. The tunable spectral filter of claim 21, wherein the beam steering element comprises:
a mirror secured to at least one of a rotational translation assembly, a linear translation assembly, or a tilt adjustment assembly.

23. The tunable spectral filter of claim 21, wherein the beam steering element comprises:
a deformable mirror.

24. The tunable spectral filter of claim 21, wherein at least one of the first filtering segment or the second filtering segment are secured in a fixed position.

25. The tunable spectral filter of claim 21, wherein at least one of the first filtering segment or the second filtering segment comprise:
at least one of a low-pass filter or a high-pass filter.

26. A tunable broadband illumination source, comprising:
an illumination source configured to generate an illumination beam; and
a tunable spectral filter configured to receive the illumination beam, comprising:
a first tunable dispersive element, wherein a dispersion of the first tunable dispersive element is adjustable, wherein the first tunable dispersive element is configured to introduce spectral dispersion to the illumination beam;
a first optical element, the first optical element configured to receive the illumination beam from the first tunable dispersive element and focus the illumination beam at a focal plane, wherein a spatial distribution of a spectrum of the illumination beam at the focal plane is controllable by adjusting the dispersion of the first tunable dispersive element;

a spatial filtering element located at the focal plane, wherein the spatial filtering element filters a spectrum of the illumination beam based on the spatial distribution of the spectrum of the illumination beam at the focal plane to form a filtered illumination beam having a filtered spectrum;

a second optical element configured to collect the filtered illumination beam from the spatial filtering element; and a second tunable dispersive element configured to receive the filtered illumination beam from the second optical element, wherein a dispersion of the second tunable dispersive element is configured to correspond to the dispersion of the first tunable dispersive element, wherein the second tunable dispersive element is configured to remove the spectral dispersion introduced by the first tunable dispersive element from the filtered illumination beam.

27. The tunable broadband illumination source of claim 26, wherein the first tunable dispersive element is configured to accept a spatially coherent illumination beam.

28. The tunable broadband illumination source of claim 27, wherein the spatially coherent illumination beam comprises:

a supercontinuum laser source.

29. The tunable broadband illumination source of claim 26, wherein at least one of the first tunable dispersive element or the second tunable dispersive element comprises:

a diffraction grating.

30. The tunable broadband illumination source of claim 29, wherein at least one of a pitch or a diffraction efficiency of the diffraction grating is adjustable.

31. The tunable broadband illumination source of claim 29, wherein the diffraction grating comprises:

at least one of an acousto-optic deflector or an electro-optic deflector.

32. The tunable broadband illumination source of claim 26, wherein the spatial filter includes a filtering segment to block a portion of the spectrum of the illumination beam based on the spatial distribution of the spectrum of the illumination beam on the filtering segment to form the filtered illumination beam.

33. The tunable broadband illumination source of claim 32, wherein adjusting the dispersion of the first tunable dispersive element controls the portion of the spectrum of the illumination beam blocked by the filtering segment.

34. The tunable broadband illumination source of claim 32, wherein the filtering segment comprises:

at least one of a low-pass filter or a high-pass filter.

35. The tunable broadband illumination source of claim 26, wherein the filtering element comprises:

an aperture to pass a portion of the spectrum of the illumination beam based on the spatial distribution of the spectrum of the illumination beam on the aperture to form the filtered illumination beam.

36. The tunable broadband illumination source of claim 35, wherein the aperture comprises:

a bandpass filter.

37. The tunable broadband illumination source of claim 35, wherein the aperture includes a first filtering segment and a second filtering segment separated by a width of the aperture, wherein the first filtering segment is configured to block a first portion of the spectrum of the illumination beam, wherein the second filtering segment is configured to block a second portion of the spectrum of the illumination beam, wherein a third portion of the spectrum of the illumination beam propagates through the aperture as the filtered illumination beam and is collected by the second optical element.

38. The tunable broadband illumination source of claim 37, wherein adjusting the dispersion of the first tunable dispersive element controls a center wavelength of the filtered illumination beam.

39. The tunable broadband illumination source of claim 35, wherein the width of the aperture is adjustable.

40. The tunable broadband illumination source of claim 39, wherein adjusting the width of the aperture controls a bandwidth of the filtered illumination beam.

41. The tunable broadband illumination source of claim 26, wherein the filtering element comprises:

at least one of a transmissive filtering element or a reflective filtering element.

42. The tunable broadband illumination source of claim 26, wherein the filtering element comprises:

a pixelated filtering element.

43. The tunable broadband illumination source of claim 42, wherein the pixelated filtering element comprises:

at least one of a spatial-light modulator, a micro-mirror array, or a deformable mirror.

44. The tunable broadband illumination source of claim 26, wherein the filtering element comprises:

one or more apodizing elements.

45. A method for tuning a broadband illumination source, comprising:

introducing spectral dispersion to an illumination beam with a first tunable dispersive element, wherein a dispersion of the first tunable dispersive element is adjustable;

focusing the illumination beam at a focal plane, wherein a distribution of a spectrum of the illumination beam at the focal plane is controllable by adjusting the dispersion of the first tunable dispersive element;

spatially filtering the spectrum of the illumination beam at the focal plane; and removing the spectral dispersion of the illumination beam with a second tunable dispersive element, wherein a dispersion of the second tunable dispersive element is configured to correspond to the dispersion of the first tunable dispersive element.

46. The tunable spectral filter of claim 1, wherein at least a portion of the spatial filtering element is reflective, wherein a single optical element comprises the first optical element and the second optical element, wherein a single tunable dispersive element comprises the first tunable dispersive element and the second tunable dispersive element, wherein the spatial filtering element reflects the filtered illumination beam along a mirrored optical path through the single tunable dispersive element and the single optical element, wherein the single optical element is configured to collect the filtered illumination beam from the spatial filtering element, wherein the single tunable dispersive element is configured to remove the spectral dispersion from the filtered illumination beam.

47. The tunable spectral filter of claim 46 further comprising:

a beam selector configured to separate the illumination beam from the filtered illumination beam received from the single tunable dispersive element along the mirrored optical path.

48. The tunable spectral filter of claim 47, wherein the beam selector comprises:
- a polarizing beamsplitter located on an optical path of the illumination beam prior to the single tunable dispersive element; and
- a quarter-wave plate located on the optical path of the illumination beam between the polarizing beam splitter and the single tunable dispersive element, wherein the polarizing beamsplitter separates the illumination beam from the filtered illumination beam received from the single tunable dispersive element received from the quarter-wave plate along the mirrored optical path.

49. The tunable spectral filter of claim 46, wherein the spatial filtering element comprises:
- a microelectromechanical system.

50. The tunable spectral filter of claim 46, further comprising:
- a beam steering element between the single optical element and the spatial filtering element configured to receive the illumination beam from the single optical element, wherein the spatial distribution of the spectrum of the illumination beam at the focal plane is further controllable by the adjusting the beam steering element.

51. A tunable spectral filter, comprising:
- a tunable dispersive element configured to receive an illumination beam, wherein a dispersion of the tunable dispersive element is adjustable, wherein the tunable dispersive element is configured to introduce spectral dispersion to the illumination beam in a first pass;
- an optical element configured to receive the illumination beam from the tunable dispersive element and focus the illumination beam at a focal plane, wherein a spatial distribution of a spectrum of the illumination beam at the focal plane is controllable by adjusting the dispersion of the tunable dispersive element; and
- a spatial filtering element located at the focal plane, wherein the spatial filtering element filters a spectrum of the illumination beam based on the spatial distribution of the spectrum of the illumination beam at the focal plane to form a filtered illumination beam having a filtered spectrum, wherein at least a portion of the spatial filtering element is reflective, wherein the filtered illumination beam is reflected from the spatial filtering element along a mirrored optical path through the optical element and the tunable dispersive element, wherein the optical element is further configured to collect the filtered illumination beam from the spatial filtering element, wherein the tunable dispersive element is further configured to receive the filtered illumination beam from the optical element and remove the spectral dispersion from the filtered illumination beam.

52. The tunable spectral filter of claim 51, further comprising:
- a beam selector configured to separate the illumination beam from the filtered illumination beam received from the tunable dispersive element along the mirrored optical path.

53. The tunable spectral filter of claim 52, wherein the beam selector comprises:
- a polarizing beamsplitter located on an optical path of the illumination beam prior to the tunable dispersive element; and
- a quarter-wave plate located on the optical path of the illumination beam between the polarizing beam splitter and the tunable dispersive element, wherein the polarizing beamsplitter separates the illumination beam from the filtered illumination beam received from the tunable dispersive element along the mirrored optical path.

54. The tunable spectral filter of claim 51, wherein the tunable dispersive element comprises:
- at least one of an acousto-optic deflector or an electro-optic deflector.

55. The tunable spectral filter of claim 51, wherein the spatial filtering element comprises:
- a microelectromechanical system.

56. The tunable spectral filter of claim 51, further comprising:
- a beam steering element between the optical element and the spatial filtering element configured to receive the illumination beam from the optical element, wherein the spatial distribution of the spectrum of the illumination beam at the focal plane is further controllable by the adjusting the beam steering element.

* * * * *